H. J. BOND.
NUT LOCK.
APPLICATION FILED FEB. 14, 1910.
957,931.
Patented May 17, 1910.
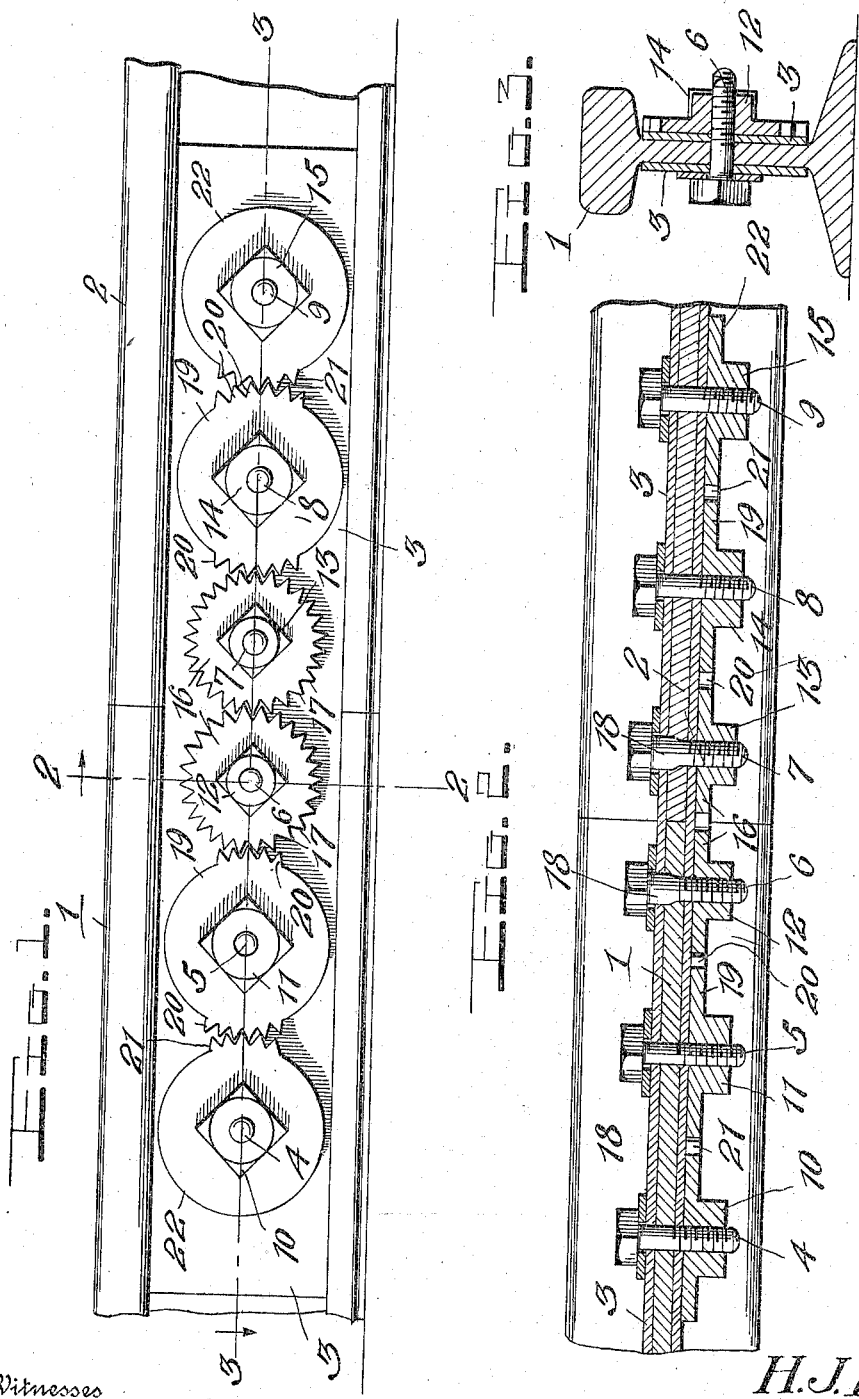
Witnesses
Chas. L. Griesbauer.
E. M. Ricketts
Inventor
H. J. Bond,
By Watson E. Coleman,
Attorney

UNITED STATES PATENT OFFICE.

HENRY J. BOND, OF PITTSBURG, PENNSYLVANIA.

NUT-LOCK.

957,931.  Specification of Letters Patent.  Patented May 17, 1910.

Application filed February 14, 1910. Serial No. 543,666.

*To all whom it may concern:*

Be it known that I, HENRY J. BOND, a citizen of the United States, residing at Pittsburg, in the county of Allegheny and State of Pennsylvania, have invented certain new and useful Improvements in Nut-Locks, of which the following is a specification, reference being had to the accompanying drawings.

My invention relates to improvements in nut locking devices and more particularly to one especially adapted for use at the joints of track rails.

The object of the invention is to provide a simple and practical device of this character in which a plurality of nuts will be locked together for simultaneous movement and so arranged on their bolts that the loosening of one nut will cause the tightening of another.

With the above and other objects in view, the invention consists of the novel construction, combination and arrangement of parts, hereinafter fully described and claimed, and illustrated in the accompanying drawings in which:—

Figure 1 is a side elevation of a rail joint showing the application of my invention thereto; and Figs. 2 and 3 are vertical and horizontal sectional views taken on the planes indicated by the lines 2—2 and 3—3 respectively in Fig. 1.

Referring to the drawings by numeral 1 and 2 denote the ends of two ordinary track rails, and 3 denotes the usual fish plates placed on opposite sides of the web portions of the rails and having longitudinal series of openings to register with similar openings in the rails and provided for the reception of bolts 4, 5, 6, 7, 8, 9. These bolts have at one end polygonal-shaped heads beneath which are arranged washers and their opposite ends are screw threaded to enter nuts 10, 11, 12, 13, 14, 15. The nuts 12, 13, which are on the bolts 6, 7, disposed close to the meeting ends of the track rails are formed with circular radially projecting flanges 16 having peripheries notched to provide teeth 17, the flanges 16 being of such width that the teeth 17 on the two nuts mesh and form in effect meshing gears so that when one nut is turned the other will be simultaneously rotated. The bolts 6, 7, are preferably oppositely screw threaded and the heads of said bolts are held against rotation as shown at 18 so that when the two nuts 12, 13, are simultaneously applied to said bolts and one of them is turned to screw it home, the other will be simultaneously screwed on to its bolt. The bolts 4, 5, are preferably provided with right hand screw threads while the bolts 8, 9, have left hand threads; and the nuts 11, 14, of the bolts 5, 8, are formed with radially projecting flanges 19, on opposite points of which are provided gear teeth 20 to mesh with similar teeth 21 formed on annular radially projecting flanges 22, which latter are formed on the endmost nuts 10, 15. The bolts 4, 5, 8, 9, are adapted to be screwed into the respective nuts after the nuts 12, 13, have been tightened on their bolts, so that after the several parts have been tightened all of the bolts or nuts will be securely locked against rotation. It will be noted that should any one of the nuts tend to loosen on its bolt it will rotate the next adjacent nut or nuts to tighten the latter.

Having thus described the invention, what is claimed is:

1. The combination of a pair of oppositely screw threaded bolts, a pair of nuts arranged on said bolts and provided with series of meshing gear teeth, a third bolt, and a nut arranged upon the latter and having teeth to mesh with the teeth of one of the first mentioned nuts.

2. The combination of a pair of oppositely screw threaded bolts, a pair of nuts arranged on said bolts and provided with series of meshing gear teeth, a second pair of bolts, nuts arranged on the last mentioned bolts and provided with teeth to mesh with the teeth on the first mentioned nuts, and means for holding the first mentioned bolts against rotation.

3. The combination with the meeting ends of two rails and fish plates arranged on opposite sides of said rails, said rails and fish plates having registering openings, of bolts passed through said registering openings, and nuts arranged on the threaded ends of said bolts and formed with radially projecting flanges notched to provide gear teeth, the teeth on the flanges of adjacent nuts meshing with each other, for the purpose specified.

In testimony whereof I hereunto affix my signature in the presence of two witnesses.

HENRY J. BOND.

Witnesses:
DANIEL W. DAVIES,
WILLIAM BOND.